United States Patent Office 2,712,623
Patented July 5, 1955

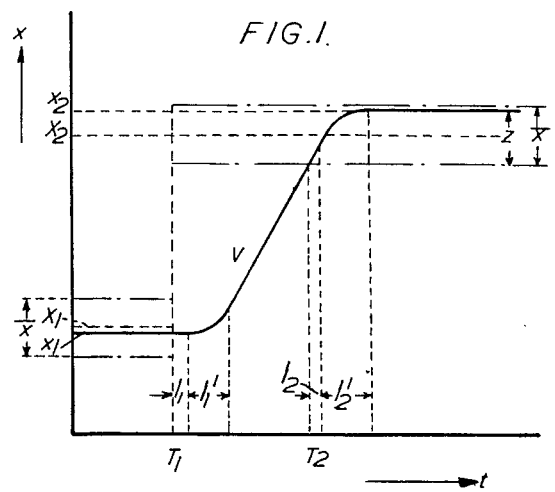
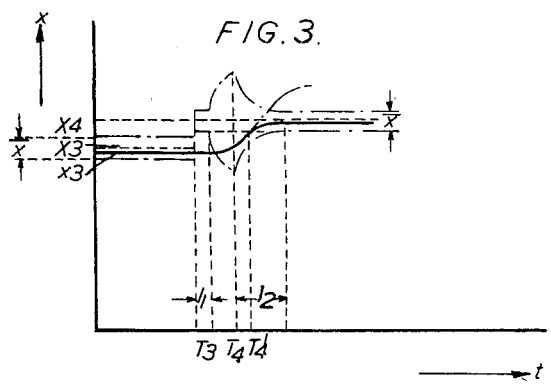

2,712,623

ANTI-HUNT CIRCUIT FOR ELECTRIC MOTOR
FOLLOW-UP SYSTEM

Iku Yosano, Minato-Ku, Tokyo, Japan, assignor to International Standard Electric Corporation, New York, N. Y., a corporation of Delaware Application June 19, 1952, Serial No. 294,465

Claims priority, application Japan June 22, 1951

8 Claims. (Cl. 318—29)

This invention relates to automatic follow-up systems and more especially to arrangements for reducing or avoiding hunting in such systems.

Heretofore in known follow-up systems, because of the inertia or mass of the part to be controlled, or because of its velocity required to follow a distant controlling member, it has been the usual practice to limit within a relatively narrow range, the departure or deviation of the controlled member with respect to a predetermined reference position. In other words, where the controlled member is to be moved from a first rest position to a second rest position it has been thought desirable to move the control member as accurately as possible in its initial movement to the new rest position, or at least confine the deviation to a very small region on either side of the rest position before the said member actually arrives at that rest position, and to maintain the deviation uniformly small.

Accordingly, one of the principal objects of this invention is to provide a follow-up system for automatically controlling the position, or the angular setting of an object, by increasing the allowable limit of deviation as the object is moving from one rest position to a new rest position.

Another object is to reduce the amount of hunting in an automatic follow-up system by increasing, over the customary method, the allowable limit of deviation as an object is approaching a new rest position, and by introducing a predetermined time lag between the instant the object begins to move from its preceding rest position, and the instant that the said increased deviation occurs; and by gradually reducing the said deviation over a predetermined interval before the object reaches its new rest position.

Another object is to reduce hunting in an automatic follow-up system by arbitrarily increasing the allowable limit of deviation as a controlled object is moving from one position of rest to a new position of rest, by increasing either continuously or intermittently the normal deviation at the beginning of such movement and by decreasing either continuously or intermittently the said deviation as the object is reaching its new position.

A feature of the invention relates to a novel automatic follow-up system of the type having a Wheatstone bridge and polarized relay combination, in conjunction with a resistor-condenser circuit which cooperates with the bridge to reduce hunting.

Another feature relates to a novel automatic follow-up system of the type having a Wheatstone bridge and polarized relay combination in conjunction with a manually adjustable resistor and a condenser circuit, and a pair of non-polarized relays which cooperate to increase the amount of permissible deviation of the controlled object as it is moving between one rest position and a new rest position.

A further feature relates to the novel combination of circuits and elements which provide an improved anti-hunting follow-up system.

In the drawing,

Fig. 1 is a graph diagram explanatory of the conventional follow-up intermittent type control system;

Fig. 3 is another graph diagram explanatory of another operating condition in the follow-up system according to the invention;

Figure 2:
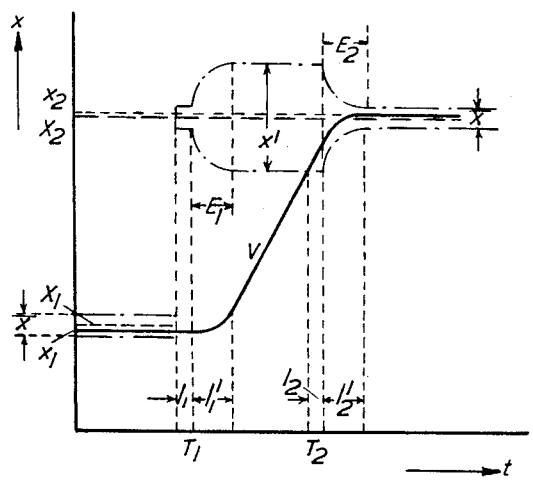
Fig. 2 is a corresponding graph diagram explanatory of one manner of operating a system according to the invention.

The present invention relates to so-called automatic remote control systems of the follow-up type, and wherein automatic discrimination is provided as to whether the position or apparent angular setting of the object to be controlled is or is not, at every moment, within an allowed deviation limit. The conventional system is arranged to control the object so that it is always within a uniform allowed deviation limit and is so arranged that it stops the object where it is, when it is within the said limit; or brings it back within the said limit if it should be outside that limit.

Fig. 1 illustrates the fundamental operation of such a conventional intermittent follow-up system in which the coordinates $t$ and $x$ represent respectively the time and the position of the controlled body or member. The values $X_1$ and $X_2$ represent respective rest positions of the member to be controlled. In other words, the controlled member is assumed to be moved suddenly from the position $X_1$ to the position $X_2$, the beginning of movement from one position to the other taking place at the instant $T_1$. Because of the finite mass of the moving parts it is not possible to achieve the sudden change of position instantaneously. Thus the velocity of the controlled member is according to the curve V. The values $\overline{x}$ represent the predetermined allowable deviation limits for the two rest positions, with the first rest position $X_1$, and with the second rest position $X_2$ respectively mid-way between the said limits. Under such conditions, if the controlled object should go out of the allowable limit $\overline{x}$ suddenly at the instant $T_1$, then the general requirement for the system is that the object begin moving towards its new rest position as soon as possible, and that it stop when it arrives within the predetermined allowed limit $\overline{x}$ so that hunting within this limit shall be reduced.

It is clear that a certain amount of time lag $t_1$ occurs after the controlled member starts moving in order to discriminate that it has moved out of the allowable limit. The velocity of the controlled member begins to increase after the said time lag until it reaches maximum velocity at the instant $t_1'$. The controlled member then comes within the allowed limit again at the instant $T_2$ and after that instant there is also an unavoidable time lag $t_2$, after which the force tending to continue the motion of the member ceases and a braking force F acts in the reverse direction. Since the velocity of the controlled member begins to decrease, after the interval $t_2'$ that member comes to rest in the new rest position. Therefore, the distance through which the member moves within the time $T_2$ is $T_2V$, and the distance through which the object moves in the interval $t_2'$ is according to the laws of energy, $MV^2/2F$, where M is the mass of the controlled member. Therefore, the distance $d$ through which the member moves subsequent to its entry into the allowed deviation limit will be approximately, $$d = T_2V + MV^2/2F \qquad (1)$$

Though the minimum possible value of $\overline{x}$ is $d$, a certain amount of tolerance must be allowed in practice, namely $$\bar{x} > T_2 V + MV^2/2F \qquad (2)$$

On the other hand, the velocity V must be as large as possible in order to provide quick response, and the predetermined allowed deviation limit $\bar{x}$ must be as small as possible for the purpose of high accuracy. As is clear from Equation 2, the requirements for $\bar{x}$ and V are mutually opposing, namely at the high velocity the accuracy is low, whereas with the high accuracy the velocity is low. This tendency is especially noticeable when $T_2$ or M is large and F is small. However, since there is a limit at which to make $T_2$ or M smaller, and F larger, it has been very difficult heretofore to control a high inertia member at high speed and good accuracy by the conventional follow-up arrangements.

The present invention has for one of its principal objects to eliminate the above-noted difficulties by providing a follow-up system which widens or enlarges the limit of deviation discrimination either continuously or intermittently, as the controlled object begins to leave one position of rest but delaying the widening of those limits for a predetermined interval after the beginning of such movement. The invention also provides for a gradual reduction of the said discrimination elements to the desired allowed or final limit with a corresponding predetermined time interval before the controlled member comes to rest.

Fig. 2 is a graph diagram explanatory of the invention and the designations shown in Fig. 2 for the various coordinates represent the same conditions as in those of Fig. 1. Let it be assumed that the controlled member had been at rest at the position $X_1$, which is mid-way between the allowable limits $\bar{x}$. Let it be assumed that at the beginning of the follow-up movement the controlled member goes beyond the said limit so that after the interval $t_1$ the member begins to move and reaches its final velocity V after the interval $t_1'$. According to the invention the width of the allowable discriminating limit $\bar{x}$ is enlarged or widened to the new and definite value $\bar{x}'$ after the member begins to move and after the time interval $E_1$. The dot-dash line in the upper part of Fig. 2 represents the said enlarged discriminating limits. While the controlled member is operating in the enlarged discriminating limit $\bar{x}'$, then after the time delay $t_2$ the braking force operates and after the interval $t_2'$ the member is brought to rest at the instant $T_3$.

Thus, the said enlarged discriminating limits reduce to the final predetermined narrow width $\bar{x}$ with a definite time lag $E_2$ after the object begins its stopping. The most desirable operation can be obtained when the length of $E_1$ and $E_2$ are selected to be nearly equal to $t_1'$ and $t_2'$. It will be understood that the enlarged limit $\bar{x}'$ is not necessarily enlarged symmetrically with respect to $X_2$ as the center. However, such symmetrical enlargement enables the most simple equipment to be used. In this case if the value of $\bar{x}'$ is chosen so as to satisfy the following equation $$\bar{x}'/2 = T_2 V . MV^2/2F \qquad (3)$$

then the object will come to rest at the position $X_2$. While the value of $\bar{x}$ can be made indefinitely small theoretically, nevertheless a certain amount of allowance must be estimated in practice. Still, it is obvious that the value of $\bar{x}$ can be made remarkably small in comparison with the customary methods as explained in connection with Fig. 1.

Fig. 3 is an explanatory diagram similar to that of Fig. 2 but with a less amount of change between the two successive rest positions of the controlled member. In this figure the successive rest positions are identified as $X_3$ and $X_4$, and $T_3$ represents the instant at which the change is to take place. In this case there is no change as concerns the operation at the beginning of the controlled movement as is apparent from the comparison of the graphs of Figs. 2 and 3. The stopping of the controlled member in Fig. 3 begins at the instant $T_4$ and the member is brought to rest at the position $X_4$. According to the customary method as explained in connection with Fig. 1 if there were no change in the deviation discrimination limits, the stopping operation would begin at the instant $T_4'$. Under such conditions the velocity of the controlled member had to be increased so considerably that it had to move far away before it is brought to rest and as a result it was very liable to hunt, especially where the value of $\bar{x}$ is required to be very small.

While in the foregoing description, reference has been made to the use of the invention in position controlling of the controlled member, it will be understood that the invention is also effective in controlling the angular setting of a member because the same relations hold true by replacing the position values by the angle values, the linear velocity by the angular velocity, the linear force by the torque, and the mass by the moment of inertia.

Figure 4:
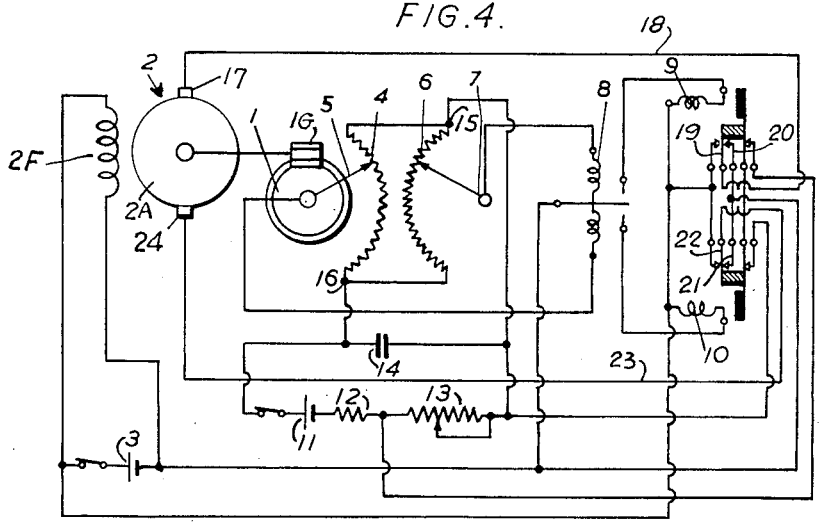
Fig. 4 is a schematic circuit diagram of one typical embodiment of follow-up system according to the invention.

Fig. 4 shows a schematic wiring diagram of a follow-up system embodying the invention. In Fig. 4, the numeral 1 represents a rotating axis to which is connected the object whose setting or angular position is to be controlled. For example, the controlled member may be the rudder of a boat or the pressure adjusting valve for the gas power or the like. The axis 1 is connected by way of suitable gears IG to the reversible direct current motor 2 of the separately excited type whose armature 2A can rotate in either direction according to the direction of current flow therethrough, this rotation corresponding to the desired angular variation of the controlled member. The field winding 2F of the motor 2 is connected to the battery 3 and is excited in one direction. In addition, a slider contact 5 for the variable resistor 4 is also fastened to the axis 1. Likewise the resistor 6 has a slider contact 7, the elements 6 and 7 being the same shape as the elements 4 and 5. The contact 7 is connected to the windings of a polarized relay 8 whose contacts are normally open but when current flows through the relay winding in excess of a certain minimum value the armature of the polarized relay will close on either of its stationary contacts dependent upon the direction of current flow through relay winding. Connected to the stationary contacts of the polarized relay are the secondary relays 9, 10. It will be clear from the drawing that when one of these relays, for example relay 9, operates, the motor 2 will rotate in a normal direction; when the other relay 10 operates the reverse rotation of the motor 2 takes place. When neither of the relays 9, 10 is operated the armature 2A is short circuited and the braking force takes place. The armature 2A is short circuited since one brush 17 is connected by conductor 18 through the normally closed contacts 19, 20 of relay 9 and thence through the normally closed contacts 21, 22 of relay 10 over conductor 23 to the other armature brush 24. As is well known, in this type of motor when the armature is short circuited it acts as a dynamic brake on the motor rotation. The numeral 11 represents a battery which supplies the electric potential to the windings of the polarized relay 8, and it is connected in series with a fixed resistance 12, an adjustable resistance 13, and an electrostatic capacity 14.

In order to explain the operation of Fig. 4, let it be considered that the variable resistance 13 is completely short circuited and the condenser 14 is absent from the circuit. Under that condition the circuit will be similar to the conventional automatic follow-up control of the prior art. The elements 4 and 6 with their respective sliders 5 and 7 form a Wheatstone bridge and since the battery 11 and polarized relay 8 are connected across the respective bridge diagonals, one diagonal being at the points 15, 16, and the other diagonal being at the points of contact between the sliders and their respective resistors. When the sliders 5 and 7 are in the same relative positions corresponding to the same angular deviation, the bridge is balanced and there is no current flow through relay 8. But if slider 7, for example, is changed in position, the bridge becomes unbalanced and current flows through the relay 8. The minimum difference of angular settings of the sliders 5 and 7 in order to operate the relay 8 is inversely proportional approximately to the potential difference at the points 15, 16. In other words, the slider 5 can deviate in position a certain amount, for example $\bar{x}$ (see Fig. 2), before the relay 8 operates.

However, when the angular setting of slider 5 differs above a certain amount in comparison with the setting of the slider 7 one contact of relay 8 closes and the corresponding one of the secondary relays 9, 10 operates. As a result, the motor 2 begins to rotate to move the slider 5 in the proper direction to eliminate the said angular difference. When the slider 5 enters into the said allowed limit $\bar{x}$, the contacts of the relay 8 open and the previously operated secondary relay 9, 10 releases. The motor armature 2 is thus short circuited and acts as an electric brake against the further movement of the slider 5.

Therefore, if the slider 7 is moved for example manually slider 5 will follow it at all times and will perform nearly the same motion. Therefore, the axis 1 can be remotely controlled by the position of the slider 7. When the inertia of motor 2, and of the axis 1 with its attached members is large, it is impossible with the conventional circuits to reduce the width of the predetermined deviation limit $\bar{x}$, so that the sensitivity of control of the polarized relay 8 is reduced considerably unless the rotational velocity of the motor is also reduced considerably.

The present invention overcomes this disadvantage by means of the condenser 14, fixed resistor 12 and the adjustable resistor 13. If the angular settings of sliders 5 and 7 are nearly equal and therefore the polarized relay 8 is normal, the variable resistor 13 is completely short circuited through the contacts of relay 9 or relay 10 and the condenser 14 is charged to a certain potential. The condition of balancing of the bridge is unchanged in that case. Therefore, in the stationary condition of the system there are no differences as compared with the customary prior art system and the polarized relay 8 continues to maintain its high sensitivity of control. Exactly in the same way when the angular deviation between sliders 5 and 7 changes, the polarized relay 8 operates immediately and also the secondary relay 9 or 10 operates to start the motor 2. The slider 5 therefore moves in the proper direction to assume the same angular setting as slider 7. At this stage, however, the resistor 13 is again inserted in the battery circuit, by reason of the opening of the appropriate contact of the secondary relay. Therefore, the potential difference between the points 15 and 16 begins to decrease with a certain decrement due to the discharge of the condenser 14. This is equivalent to a decrease in the sensitivity of the polarized relay 8 to an enlarged deviation corresponding to $\bar{x}'$ (Fig. 2), and thus the discriminating limit of the relative angular deviation between sliders 5 and 7 is enlarged over what it would be in the absence of the condenser 14.

When the slider 5 enters within the said limit $\bar{x}'$, the reverse process takes place. Thus, the motor 2 stops, the variable resistance 13 is short circuited and the condenser 14 is charged and reaches its equilibrium state after a predetermined time lag. Therefore, the potential difference between points 15 and 16 and the sensitivity of the relay 8 recover their initial values.

As a result of the foregoing system, the axis 1 can be driven with high speed and the desired sensitivity of the polarized relay 8 can be increased even when the axis 1 with its attached members has considerable inertia. Furthermore, by manually adjusting resistor 13 it is very easy to adjust the system to the best condition since the rate of enlargement of the discriminating limit $\bar{x}'$ can be predetermined, and the optimum length of the intervals $t_1$ and $t_2$ can be attained by adjusting the capacity of the condenser 14. It is therefore possible with the described invention to increase the controlling accuracy sufficiently without hunting, even when using controlled parts of high inertia.

What is claimed is:

1. An automatic follow-up system comprising in combination, a controlling member, a controlled member, a comparison circuit of the balanced bridge type and responsive to difference in relative settings of said members to produce a voltage for automatically controlling the resetting of said controlled member as long as said voltage is not within a predetermined limited discrimination range, a marginally sensitive relay which responds to said voltage to maintain said controlled member within certain restricted discrimination limits at each rest position of said controlled member and additional means including a condenser and condenser charging circuit to increase said discrimination limits in the interval between the movement of said controlled member from one rest position to a succeeding rest position.

2. An automatic follow-up system according to claim 1, in which said increased discrimination range has a voltage-time characteristic which gradually increases as the said control member is leaving its previous rest position and gradually decreases as it is approaching said succeeding rest position.

3. An automatic follow-up system according to claim 1, in which said additional means includes a condenser connected across one of the diagonals of said bridge.

4. An automatic follow-up system according to claim 1, in which said additional means includes a condenser and a charging potential source connected across one of the diagonals of said bridge.

5. An automatic follow-up system according to claim 1, in which said additional means includes a condenser connected across one diagonal of said bridge and an adjustable resistance and battery connected in shunt to said condenser.

6. An automatic follow-up system comprising in combination, a controlling member, a controlled member, a discrimination circuit responsive to difference in relative settings of said members to produce a reset control voltage for said controlled member and to hold said controlled member within restricted deviation limits at each rest position, a motor for operating said controlled member, and relay means connected to said discrimination circuit for opening and closing the motor circuit, said discrimination circuit also including a condenser-charging circuit which is rendered effective under control of said relay means when said controlled member is approaching a succeeding rest position from a previous rest position to widen said deviation limits.

7. An automatic follow-up system comprising in combination, a controlling member, a controlled member, each of said members including an adjustable potentiometer having a slider arm, an electric motor for operating the slider arm of the controlled member, means interconnecting said potentiometers and slider arms to form a Wheatstone bridge, means connecting said slider arms through a polarized relay, a source of direct current potential connected across one diagonal of said bridge, a condenser also connected across said diagonal of the bridge, a resistance connected to said direct current source and said condenser to control the charging rate of said condenser, a pair of relays selectively operable in accordance with the operation of said polarized relays, and connections from said pair of relays to short-circuit said resistor when both relays of said pair are unoperated.

8. A system according to claim 7, in which said motor is of the separately excited direct current type, said motor having its armature connected to corresponding contacts of said pair of relays to short-circuit said armature when said pair of relays are normal.

References Cited in the file of this patent

UNITED STATES PATENTS

| | | |
|---|---|---|
| 1,942,587 | Whitman | Jan. 9, 1934 |
| 2,079,497 | Wilhjelm | May 4, 1937 |
| 2,132,960 | Montrose-Oster | Oct. 11, 1938 |
| 2,445,289 | Cherry | July 3, 1948 |
| 2,471,075 | Montrose-Oster | May 24, 1949 |
| 2,674,707 | DeMott | Apr. 6, 1954 |